United States Patent [19]
Coleman et al.

[11] Patent Number: 5,676,988
[45] Date of Patent: Oct. 14, 1997

[54] U.F.O. POP

[76] Inventors: Thomas J. Coleman, 19170 Paddock Pl.; William K. Schlotter, IV, 20308 Alvarado Rd.; Princess Ann Coleman, 19170 Paddock Pl.; Ann M. Schlotter, 20308 Alvarado Rd., all of Abingdon, Va. 24211

[21] Appl. No.: 595,302

[22] Filed: Feb. 1, 1996

[51] Int. Cl.$^6$ ............................................. A23G 9/22
[52] U.S. Cl. ..................... 426/134; 362/109; 362/208; 362/253; 446/47; 446/86; D21/59; 493/959
[58] Field of Search ..................... 426/104, 134; 362/86, 109, 157, 190, 202, 205, 208, 253, 811; 493/959; D21/59; 446/47, 86

[56] References Cited

U.S. PATENT DOCUMENTS

| | | |
|---|---|---|
| 202,118 | 4/1878 | Raetz . |
| 202,742 | 4/1878 | Mohr . |
| D. 221,453 | 8/1971 | Swanberg . |
| 404,042 | 5/1889 | Johnson . |
| 1,405,075 | 1/1922 | Tiedeman . |
| 2,624,153 | 1/1953 | Johnson et al. . |
| 2,921,404 | 1/1960 | Lescher . |
| 3,082,572 | 3/1963 | Knox, Jr. . |
| 3,430,620 | 3/1969 | Davis . |
| 4,030,472 | 6/1977 | Watkins . |
| 4,399,803 | 8/1983 | Bertini . |
| 4,538,999 | 9/1985 | Orlowski . |
| 4,867,728 | 9/1989 | Moomaw . |
| 4,914,748 | 4/1990 | Schlotter, IV et al. . |
| 5,080,624 | 1/1992 | Brinker . |
| 5,125,862 | 6/1992 | Paranto . |
| 5,209,692 | 5/1993 | Coleman et al. . |
| 5,261,851 | 11/1993 | Siebert, Jr. . |
| 5,391,107 | 2/1995 | Coleman . |
| 5,471,373 | 11/1995 | Coleman et al. . |
| 5,503,857 | 4/1996 | Coleman et al. . |
| 5,536,054 | 7/1996 | Liaw . |

*Primary Examiner*—W. L. Walker
*Attorney, Agent, or Firm*—Melvin L. Crane

[57] ABSTRACT

The U.F.O. Pop consists of a sucker-type candy with a candy stick inserted into an aperture at the top of a clear plastic upper housing. The clear plastic upper housing is connected to the plastic lower housing with a toy creature inside. The top of the plastic lower housing contains a circuit board, LEG bulbs, contact switch and a battery operated power supply. The outside of the plastic lower housing has a launch button on one side and a contact switch on the opposite side. The inside of the plastic lower housing contains a launch button, pin, push block with an anchored pivot point, release mechanism and a spring anchor containing a windup spring and a spinner shaft. The buttom of the plastic lower housing has winding locks and a spinner end. The flying disk is connected to the spinner end by placing the winding lock teeth over the winding locks at the bottom of the plastic lower housing. The flying disk is turned to windup for flight. It is now ready to launch. To launch the flying disk press the launch button. This causes the push block to engage the release mechanism. The release mechanism is pressed downward on the top of the spinner shaft to push the spinner and outward releasing the flying disk into the air.

6 Claims, 3 Drawing Sheets

U.F.O. POP

This invention is directed to a candy pop holding device which includes flashing lights with a candy pop secured to one end of the housing and a mechanism for launching a spinning disk at the opposite end.

PRIOR ART AND OBJECTS

Heretofore devices have been made to which a candy pop is secured at one end and other devices have been made which function to launch a spinning object. Such patents include Des 221,453; 202,118; 202,742; 404,042; 1,405,075; 2,624,153; 2,921,404; 3,082,572; 3,430,620; 4,030,472; 4,399,803; 4,538,999; 4,867,728, 5,080,624; 5,125,862; 5,209,692 and 5,261,851.

This invention is a novelty toy and candy pop holding device. The device includes a housing in which a main portion of the device is a toy with flashing lights that presents an effect of a space ship. A candy pop is held by an upper end of the housing and the upper end of the housing contains a toy creature such as a space alien. A lower end of the housing includes an electrical circuitry for the lights, and controls for the electrical circuitry and the spring loaded device for launching a spinning object or space ship.

It is therefore an object of the invention to provide a novelty toy and candy pop holding device which can be amusing for a child or adult and which can be used as a candy pop holder and/or a spinning device launcher.

Another object is to provide a novelty toy and candy pop holder which has a lighting display which can be used during consumption of a candy pop or used during launching a spinning device.

Still another object is to provide a novelty toy which can amuse a person and also has a use as a candy pop holder.

BRIEF DESCRIPTION OF THE DRAWINGS

These and other features of the invention may be better understood with reference to the accompanying specification and drawings in which:

FIG. 4 illustrates the spinning object or flying disk.

DETAILED DESCRIPTION OF THE INVENTION

Figure 1:
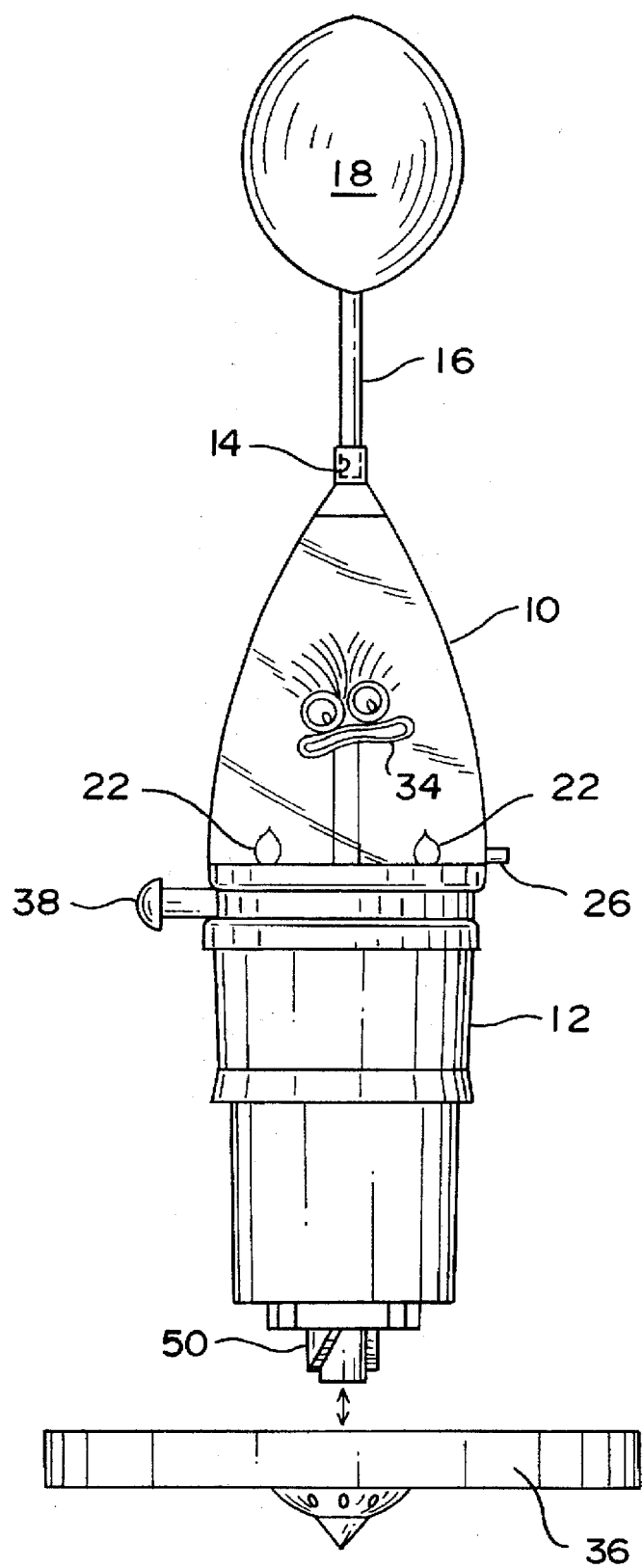
FIG. 1 illustrates an overall view of the length of the device with the spinning device displayed from the bottom of the housing.
Figure 2:
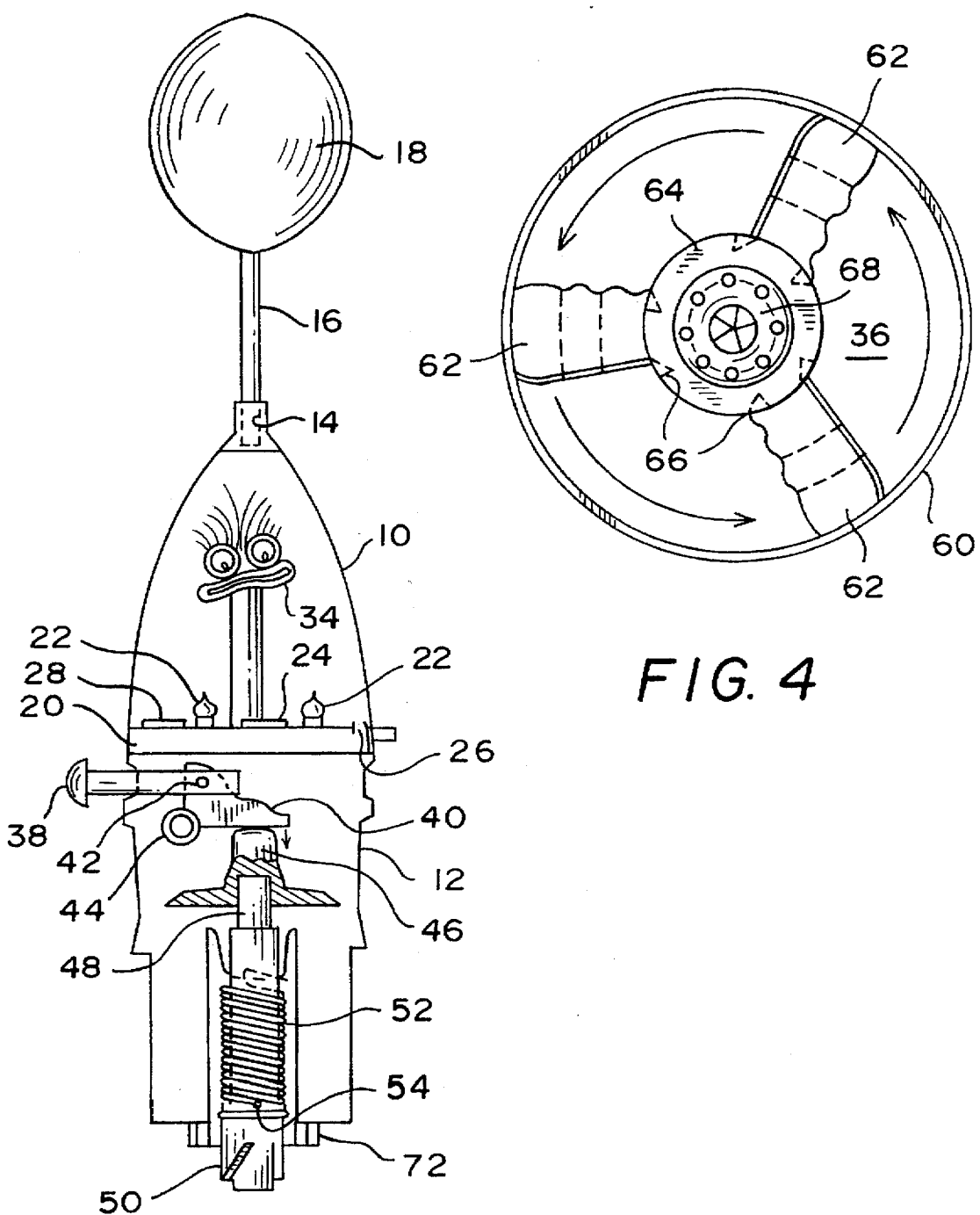
FIG. 2 illustrates a partial cross-sectional view which shows the operative parts.
Figure 3:
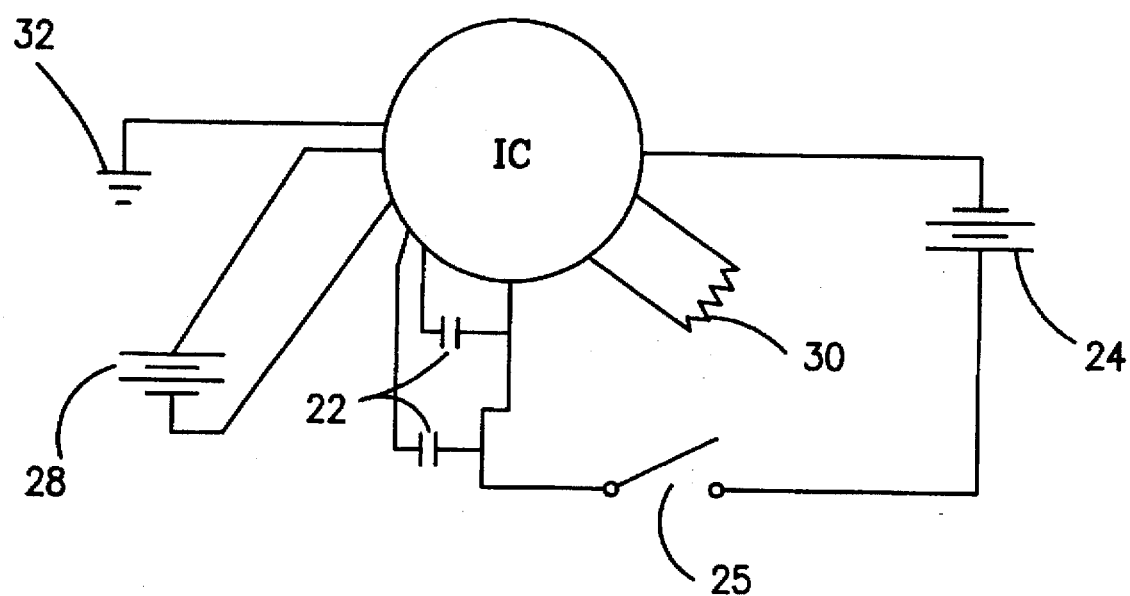
FIG. 3 illustrates the electrical circuitry for the lights.

As shown in the drawings, there is a two part housing 10, 12 made of a plastic material or any other suitable material. The upper housing part has a axial opening 14 at the upper end by which a stick 16 to which the candy pop 18 is secured to the housing. A circuit board 20 is secured within the upper end of the bottom housing. The circuit board includes the LED bulbs 22, a power supply 24 for the LED bulbs, a control switch 26, a power supply 28 for an integrated circuit (IC) which controls the LED bulbs to provide flashing lights, a 220 kohm resistors 30 is connected in the IC and the circuit is grounded at 32. A toy creature 34 is secured to the circuit board and extends upwardly into the upper housing.

A control for operation of the spinning object or flying disk 36 is contained within the bottom housing and provided with a launch button 38 that extends from the housing and which is connected to a push block 40 by a pin 42. The push block 40 is pivotable about a pivot means 44 in order to press against a release mechanism 46 which will be explained later. The launch mechanism includes a spinner shaft 48 which connects at one end of the release mechanism in which the opposite end 50 extends from the bottom end of the lower housing. The spinner shaft 48 is surrounded by a coil spring 52 which is secured at one end 54 to the spinner shaft. The opposite end of the coil spring 52 is secured within the lower housing portion so that as the shaft is rotated the spring will tighten to produce a rotating force when the launch button is pressed to release the spinner shaft.

FIG. 4 illustrates a bottom of the flying object or flying disk 36. The flying disk includes an outer ring 60 to which air foil blades 62 are attached at one end. The inner ends of the air foil blades extend from a central hub 64 which includes winding lock teeth 66 on the upper side and a central portion 68 that mates with ridges 70 on the spinner end 50 that extends from the lower end of the housing.

In operation, the flying disk is fitted over the end of the spinner shaft 48 that extends from the lower housing. When the flying disk is pressed onto the spinner shaft end the spinner shaft will move upwardly so that the winding lock teeth 66 will slide by the winding locks as the spinner shaft is rotated to wind the spring in order to load the spring. Once the spring has been wound, the spinner shaft is permitted to rotate slightly in the opposite direction. As the spinner shaft rotates in the opposite direction the flying disk is held up against the winding locks so that the winding lock teeth on the flying disk catch onto the winding locks 72 secured to the bottom of the lower housing. The winding lock teeth do not engage the winding locks as the spinner shaft is rotated to load the spring, however, when the winding lock teeth engage the winding locks the spinner shaft will not unwind. Once the spring has been tightened or loaded and the winding lock teeth engage the winding locks, the device is ready to release the flying disk.

The contact switch can be pressed in in order to close the electrical circuit to the I.C. and bulbs 22. Thus the light bulbs will begin to flash as controlled by the I.C.. The device can be held in an upright position with the flying disk up, then the launch button can be pressed in which pivots the push block against the release mechanism on the upper end of the spinner shaft. As the release button is pressed, the spinner shaft will be forced outwardly of the lower end of the housing which releases the winding lock teeth from engagement with the winding locks. As the flying disk is released from the winding locks, the spring causes the spinner shaft to rotate very fast and as the spinner shaft rotates very fast the flying disk will rotate with the spinner shaft and due to the air foil blades, the flying disk will be released from the spinner shaft and will fly in the air.

Since a candy pop or sucker can be secured to the upper end, the device can be used as a holder during consumption of the candy pop. The I.C. circuit can be operated to make the lights flash during consumption of the candy pop as well as during loading and releasing the flying disk.

It is therefore obvious to one skilled in the art that the UFO pop can be used as a holder for a candy pop during consumption with the flashing lights shining onto the face of chin of the consumer. Furthermore the device can be used to launch a flying disk, also while the lights are flashing.

It would be obvious to one skilled in the art that upper housing 10 could include candy instead of the toy 34. The upper end of the housing to which the candy pop stick 16 is secured could be made removable in order to add and remove candy to the upper housing area. Also it would appear to one skilled in the art that the flying object can be released toward the ground or some other smooth surface so that the flying object will rotate on the surface. The flying object has a downwardly extending end as shown in FIG. 1 so that the flying object will spin on the sharp end.

What is claimed is:

1. A U.F.O. pop which comprises a housing having an upper portion and a bottom portion, an integrated circuit within said housing which controls at least one bulb to flash, means to which a candy pop can be secured, means to which a flying disk can be secured for launching said flying disk, means which can be loaded to apply a rotating force on said flying disk, and control means for releasing said flying disk.

2. A U.F.O. pop as set forth in claim 1 wherein there are at least two lights controlled by said integrated circuit.

3. A U.F.O. pop as set forth in claim 2 in which said means on which said flying disk is loaded is a spring loaded spinner shaft.

4. A U.F.O. pop as set forth in claim 3 which includes winding locks on an end of said bottom housing, said winding locks functioning to lock said flying disk in place for launching from said U.F.O. pop.

5. A U.F.O. pop as set forth in claim 1 in which a space alien is included within said housing.

6. A U.F.O. pop which comprises a housing, an aperture in an upper end of said housing which receives one end of a stick upon which a candy pop is formed, a circuit board, LED bulbs, a battery operated power supply for operating said LED bulbs, a power supply and a switch for operating said circuit board, a spinner shaft, a windup spring surrounding said spinner shaft for applying a rotatable force onto said spinner shaft, a launch button and a push block for operating a spinner shaft release mechanism, winding locks on a bottom of said housing and surrounding said spinner shaft, and a flying disk secured onto one end of said spinner shaft and locked in place for launching by said winding locks whereby a rotating force is applied onto said spinner shaft by said winding spring and said spinner shaft is released by said launch button in order to launch said flying disk.

* * * * *